United States Patent
Novik et al.

(10) Patent No.: US 7,284,245 B2
(45) Date of Patent: Oct. 16, 2007

(54) QUERY TREES INCLUDING OR NODES FOR EVENT FILTERING

(75) Inventors: Lev Novik, Bellevue, WA (US); Irena Hudis, Bellevue, WA (US); Raymond W. McCollum, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/663,410

(22) Filed: Sep. 15, 2003

(65) Prior Publication Data

US 2004/0064758 A1 Apr. 1, 2004

Related U.S. Application Data

(62) Division of application No. 09/517,895, filed on Mar. 3, 2000, now Pat. No. 6,918,124.

(51) Int. Cl.
*G06F 3/00* (2006.01)
(52) U.S. Cl. ..................................................... 719/310
(58) Field of Classification Search ................. 719/310
See application file for complete search history.

(56) References Cited

U.S. PATENT DOCUMENTS

| 5,666,528 | A | | 9/1997 | Thai | |
|---|---|---|---|---|---|
| 5,850,516 | A | * | 12/1998 | Schneier | 726/25 |
| 5,852,826 | A | * | 12/1998 | Graunke et al. | 707/7 |
| 6,253,195 | B1 | | 6/2001 | Hudis et al. | |
| 6,366,926 | B1 | | 4/2002 | Pohlmann et al. | |
| 6,405,191 | B1 | | 6/2002 | Bhatt et al. | |
| 6,438,618 | B1 | | 8/2002 | Lortz et al. | |
| 6,493,703 | B1 | | 12/2002 | Knight et al. | |
| 6,848,078 | B1 | * | 1/2005 | Birsan et al. | 715/511 |

OTHER PUBLICATIONS

Ehab S. Al-Shaer, A Survey of Event Filtering Mechanisms for Dynamic Multi-point Applications, Sep. 11, 1996.*
Ehab S. Al Shaer et al., A Survey of Event Filtering Mechanisms for Dynamic Multi-Point Application, Sep. 11, 1996.
Ehab S. Al Shaer et al., High Performance Event Filtering for Distributed Dynamic Multi-Point Applications: Survey and Evaluation, 1997.
William Ford, Data Structure With C++, 1997.

* cited by examiner

*Primary Examiner*—LeChi Truong
(74) *Attorney, Agent, or Firm*—Workman Nydegger

(57) ABSTRACT

Filtering trees for selectively notifying subscribers of events are provided, and are constructed with OR nodes to substantially reduce their size. The filtering trees have nodes representing event variables that ultimately branch to leaf nodes thereunder, and the leaf nodes identify which of a set of queries are satisfied by an actual event. A mechanism recursively merges nodes of trees into a single tree, and uses OR nodes when nodes cannot be combined, to essentially add a parallel path in the resulting tree to traverse. Nodes that can be combined are those that represent the same event variable, and may have data points that are merged into a combined node. Threshold gains in efficiency may be evaluated to determine whether the original trees should be kept instead of the resulting tree.

9 Claims, 11 Drawing Sheets

QUERY TREES INCLUDING OR NODES FOR EVENT FILTERING

CROSS-REFERENCE TO RELATED APPLICATION

This application is a division of U.S. patent application Ser. No. 09/517,895, filed Mar. 3, 2000 now U.S. Pat. No. 6,918,124.

FIELD OF THE INVENTION

The present invention relates generally to computer systems, and more particularly to constructing filtering trees that can be traversed to determine whether an event, data, or another instance satisfies the terms of a query.

BACKGROUND OF THE INVENTION

Event detection in computer systems allows management software to reliably identify the components and configuration of a computer system, to respond to hardware failures, and/or to otherwise monitor and improve the operation of the system. The range of events that may be detected by computer systems and reported to management or other subscriber applications is essentially unlimited. Some examples of computer detectable events include disk drive activity and errors, installation or de-installation of hardware components, network server activities and failures, and network security breaches. Such events may be generated by event providers as they occur, or detected via a polling operation.

Events are often detected by drivers associated with hardware components, operating system software, and instrumentation specifically designed to monitor hardware or software. As the number of hardware components, the complexity of software, and the size of computer networks continues to increase, it has become increasingly difficult to create management and other applications that can become aware of the occurrence of events in hardware and software components in an efficient manner. For example, a typical application is not normally interested in being notified of every event that is detected in system or network, and thus some form of selective notification is needed to improve efficiency. At the same time, it is often critical that an application does not miss an event in which it is interested. As a result, the processes for detecting and reporting the occurrence of events have become increasingly important and complex.

U.S. patent application Ser. No. 09/175,592, entitled "Using Query Language for Provider and Subscriber Registrations," filed Oct. 20, 1998, which is a continuation-in-part of U.S. patent application Ser. No. 09/158,171, hereby incorporated by reference herein in their entireties, describe anary (not necessarily binary) filtering trees which are efficiently used by an event filtering mechanism and/or event providers to selectively report events to event subscribers that have registered for notification of those events. The filtering trees are constructed from queries received from event subscribers, and arranged such that traversing one or more appropriate trees using actual parameters accompanying an event determines whether a query is satisfied, i.e., whether a given subscriber should be notified. Moreover, multiple trees may be merged into a single tree. In this manner, a relatively large numbers of queries may be evaluated in a single traversal of a single tree.

In general, the filtering trees are arranged as hierarchies of nodes, with parent nodes representing parameters, and each parent node capable of having multiple data points corresponding to the values of a parameter to be evaluated. Depending on the result of the evaluation against the actual parameter values for a given event instance, the parent node branches to an appropriate child node representing further parameters to be evaluated, or to a leaf node which specifies whether a query is (or which queries are) satisfied by the event parameters and actual values. The subscribers that correspond to the satisfied queries are then rapidly determined. Note that the nodes and/or data points may be strings or other values, for example, strings that represent hardware device types.

By way of example, the filtering mechanism may receive a query from an event subscriber, such as an application or operating system, instructing the filtering mechanism to notify the subscriber whenever particular type of modem is added (but no other types of modems or hardware). The event filtering mechanism may then construct or modify an existing filtering tree to filter events so as to find this query when this type of modem is detected. For example, such a tree may include a first-level node that branches to a lower node when hardware change events are detected. Below the hardware node, a second-level child node may be present with data points, one of which represents modems, and others which represent other types of hardware devices. Below the node that represents the general class of devices, and pointed to by the data point that represents modems, a third-level child node may include data points representing particular types of modems. The particular type of modem being queried for may point to a leaf node, for example, that lists the satisfied query (along with any other queries that are satisfied). Alternatively, the leaf node may list the subscribers to be notified, or a set of true/false values that correspond to a set of queries.

While the use of filtering trees is thus highly efficient in event filtering operations, a tree may grow exponentially when representing queries having multiple parameters. For example, consider a tree having a node with data points that represent many possible values for an "X" parameter, e.g., two, four, nine, sixteen and twenty-eight. Every "X" node may have multiple possible outcomes, e.g., if one "X" node represents the value of two, the node may branch three different ways for an actual parameter value, i.e., one branch to handle less than two, a second for equal to two, and a third for greater than two. Note that the "less than" branch of the next highest "X" data point (e.g., four) will point to the "greater" than branch of the nearest value below (e.g., two), whereby each level has 2n+1 possible outcomes (where n is the number of data points on a node). When multiple parameters are being evaluated, some or all of the "X" node outcomes may branch to a lower-level node representing a "Y" parameter. This node also has data points with 2n+1 possible outcomes, some or all of which may branch to nodes for evaluating a still lower-level "Z" parameter, and so on. While highly efficient to traverse, such a filtering tree may consume a significant amount of storage.

SUMMARY OF THE INVENTION

Briefly, the present invention provides a method of combining first and second filtering trees using OR nodes to reduce the size of the tree. The method operates by determining whether two nodes at a common level of each of the first and second trees are both OR nodes, and if so, a single resulting OR node of a single resultant filtering tree is provided. Each child node of the first tree that can be successfully combined with a child node of the second tree is merged into a merged node, and each merged node is added to the resulting OR node as a child node thereof. The merging is recursive, i.e., child nodes beneath a merged node are merged into a merged child node when they can be successfully combined. Child nodes of the first and second trees that cannot be successfully combined are added to the resulting OR node as a children.

If the nodes of the two trees are not both OR nodes, the nodes are further evaluated in that if one node is an OR node, the node that is not an OR node is treated as a single child of an OR node, and the children are merged and/or added to a single resultant OR node as described above. If neither node is an OR node, they are evaluated to determine if they represent a same event variable, in which event they are merged, e.g., by performing a union of a set of data points of each node, and merging children thereof.

Traversing the tree is also provided after receiving notification of an occurrence of an event, in order to determine at least one query satisfied by the event. When an OR node is reached, the traversal branches to a child node of the OR node, which is then evaluated against actual event information in order to branch to a leaf node (possibly through other child nodes) based on the result. The leaf node provides query information, e.g., which queries are satisfied (or which subscribers should be notified). The traversal may return to the OR node and branch to another child of the OR node in order to obtain additional query information from a leaf node reached via an evaluation of the other child node.

A tree data structure is also provided, including a first child node representing a first event parameter with at least two leaf nodes including query information under the first child node, and a second child node representing a second event parameter with at least two leaf nodes including query information thereunder. An OR node is a parent of the first and second child nodes, such that the first node is branched to by the OR node during a tree traversal, and the first node selectively branches to one of the leaf nodes thereunder based on an evaluation of actual event data to obtain first query information therefrom. The second node may also be branched to by the OR node during a tree traversal, and the second node selectively branches to one of the leaf nodes thereunder based on an evaluation of actual event data to obtain second query information therefrom. The child nodes may include data points for evaluating against actual event parameter values.

Other advantages will become apparent from the following detailed description when taken in conjunction with the drawings, in which:

DETAILED DESCRIPTION OF THE PREFERRED EMBODIMENT

Exemplary Operating Environment

Figure 1:
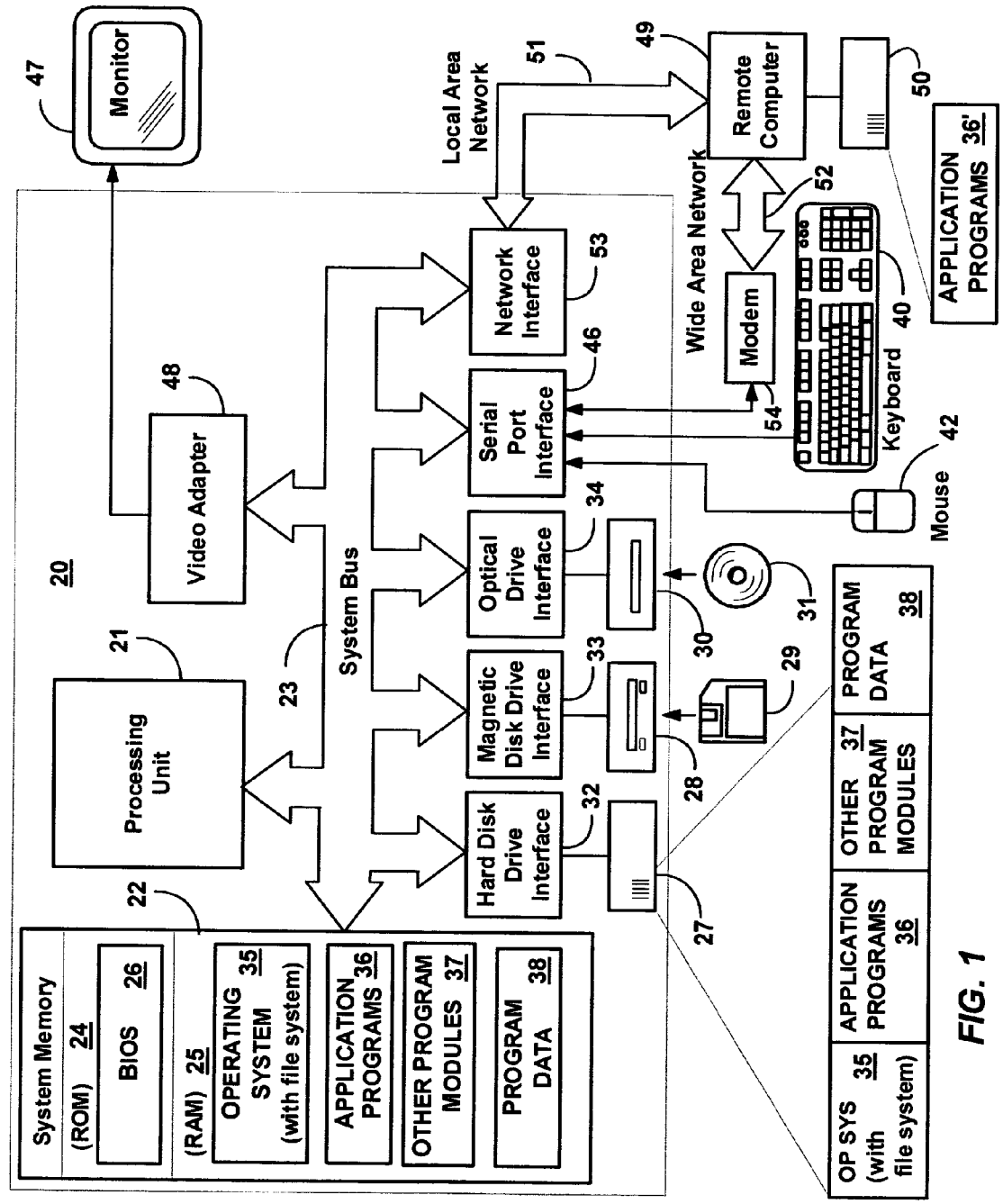
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (such as Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Query Trees for Event Filtering

Figure 2:
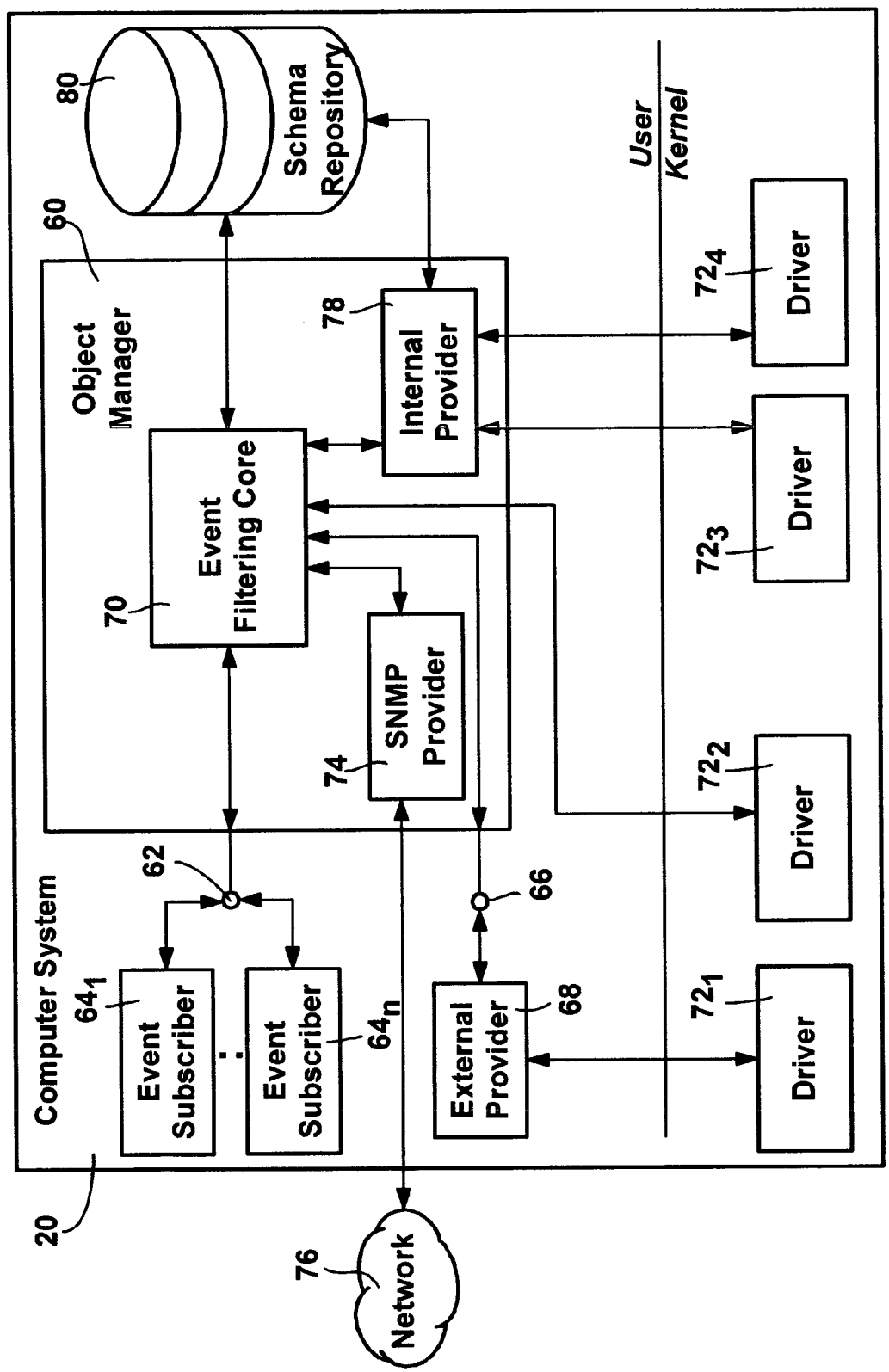
FIG. 2 is a block diagram generally representing a suitable architecture for employing filtering trees for filtering events detected in a computer system and reporting the filtered events to an event subscriber.

FIG. 2 is a schematic diagram depicting one embodiment of the invention in which the computer system 20 includes an object manager providing a standard interface for event subscribers and event providers. The object manager 60 of the computer system 20 includes a standard interface 62 via which it can communicate with one or more event subscribers $64_1$-$64_n$. The object manager 60 may also include other standard interfaces such as an interface 66 for communicating with one or more external event providers such as the external event provider 68. The occurrence of events is reported to an event-filtering core 70 of the object manager 60 by drivers, (e.g., four drivers are shown, $72_1$-$72_4$), an SNMP provider 74 which may report events of a network 76, an internal event provider 78, the external event provider 68, and/or other instrumentation.

The SNMP provider 74 reports the occurrence of events on a network, such as the network 76, using a standard, well-known protocol. The internal provider 78 is internal in the sense that in general, it is integrated with object manager 60 and can communicate with other components of the object manager 60 without the use of a communications hub or similar hardware. Note that in the example shown herein, the SNMP provider 74 is another example of an internal event provider. When the object manager 60 is practiced in a Windows® 2000 environment, for example, internal providers 78 may include Win 32 event providers and Windows Management Instrumentation (WMI) providers.

Although the object manager 60 may include one or more internal providers as described above, the present invention is particularly useful for reporting events detected by one or more external event providers such as the external provider 68. The external event provider 68 is external in the sense that it communicates with the object manager 60 via a communications link and the standardized interface 66. The external provider 68 may be written and/or supplied by a third-party manufacturer that is different from the supplier of the object manager 60. For example, any original equipment manufacturer (OEM) can extend the driver that controls the function of its hardware to include an external event provider 68 that can communicate with the object manager 60 via the standardized interface 66. Indeed, the object manager 60 and the event-filtering core 70 allow events to be efficiently reported to event subscribers 64 without the manufacturers of external providers 68 and the manufacturers of the event subscribers having a detailed knowledge of one another.

As shown in the example of FIG. 2, events detected by the event drivers $72_3$ and $72_4$ are reported to the event-filtering core 70 by the internal provider 78. Events detected by the event driver $72_1$ are reported by the external provider 68, while events occurring on the network 76 are reported by the SNMP provider 74. Note that the drivers $72_1$ and $72_3$-$72_4$ are examples of event-detection components. The systems of the invention can also report events detected by drivers or other instrumentation without the assistance of intermediate event providers via a polling operation as described below. For example, the driver $72_3$ has no associated event provider. Instead, the object manager 60 periodically communicates with (polls) the driver $72_2$ to learn of the occurrence of any events detected thereby.

In one embodiment of the invention, a schema repository 80 defines an object-oriented, hierarchical classification of event classes. The event classes allow the event-filtering core 70 to efficiently determine the scope of the events that are to be reported to the event subscribers $64_1$-$64_n$ and the events that may be reported by event providers 68, 74, and 78. The Common Information Model (CIM), generally described in U.S. patent application Ser. No. 09/020,146, assigned to the assignee of the present invention and herein incorporated by reference in its entirety, provides one suitable schema for use with the present invention.

Event providers 68, 74, and 78 send notifications to the event-filtering core 70 as an events occur, and the event-filtering core 70 then filters the events to identify those that are to be reported to one or more of the event subscribers $64_1$-$64_n$. In one embodiment, the filtering is conducted by comparing the event classes of the events and parameters of the events to event-filtering definitions, which may be written in a query language. The event classifications defined in schema repository gives context to query-based filtering definitions, thereby allowing the event-filtering core 70 to filter the events. Event filtering is described below.

Figure 3:
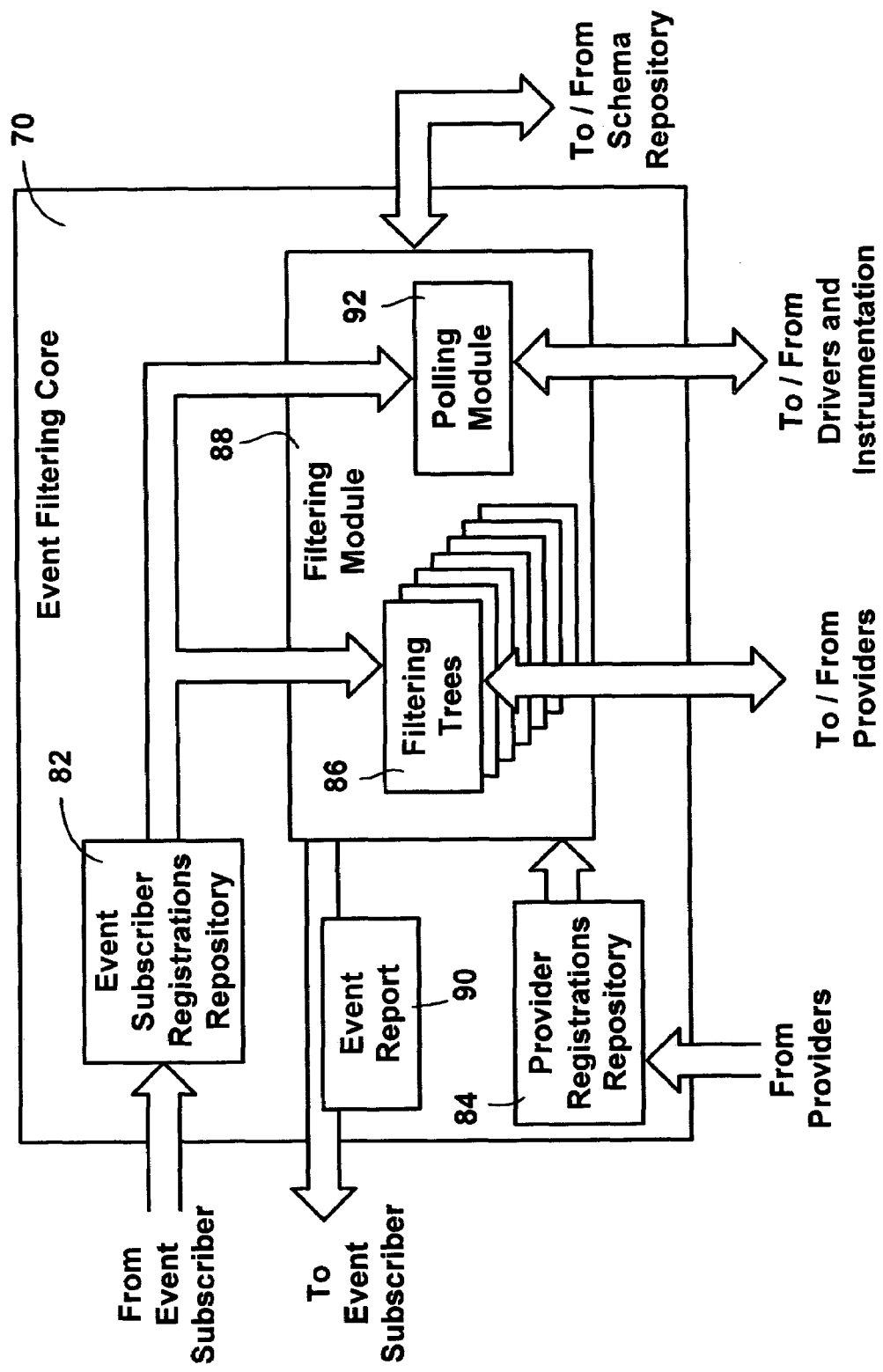
FIG. 3 is a block diagram generally representing components for constructing and using filtering trees in the architecture of FIG. 2.

FIG. 3 further illustrates various features and components of the event-filtering core 70 of FIG. 2, including a suitable structure for constructing and traversing the filtering trees of the present invention. As generally depicted in FIG. 3, the event-filtering core 70 includes an event subscriber registrations repository 82 and a provider registrations repository 84. When the event-filtering core 70 is initialized on a computer system 20 or when an event subscriber (FIG. 2) is installed, the event subscriber (e.g., $64_1$) registers an event-filtering definition in the form of one or more queries, as generally described below. Similarly, the event providers 68, 74, and 78 register at the provider registrations repository 84. The registration may also include queries.

In keeping with the present invention, the event-filtering core 70 assembles one or more filtering trees 86 in a filtering module 88. In general, one way in which the filtering trees 86 may be used is to compare a reported event against one or more event-filtering definitions associated with some or all of the event subscribers $64_1$-$64_n$. Moreover, each event provider may have an associated filtering tree 86 defined in the filtering module 88. After comparing the reported events against the event-filtering definitions using the filtering trees 86, any events satisfying the event-filtering definitions result in an event report 90 being sent to the appropriate event subscriber or subscribers.

Moreover, the filtering module 88 may include a polling module 92 for actively identifying when particular events have occurred. For example, if a computer system 20 includes a disk drive without an associated event provider, and an event subscriber has requested a report of events at the disk drive, the polling module 92 may periodically determine whether events of interest have occurred at the disk drive, and if so, provide a suitable notification.

Figure 4:
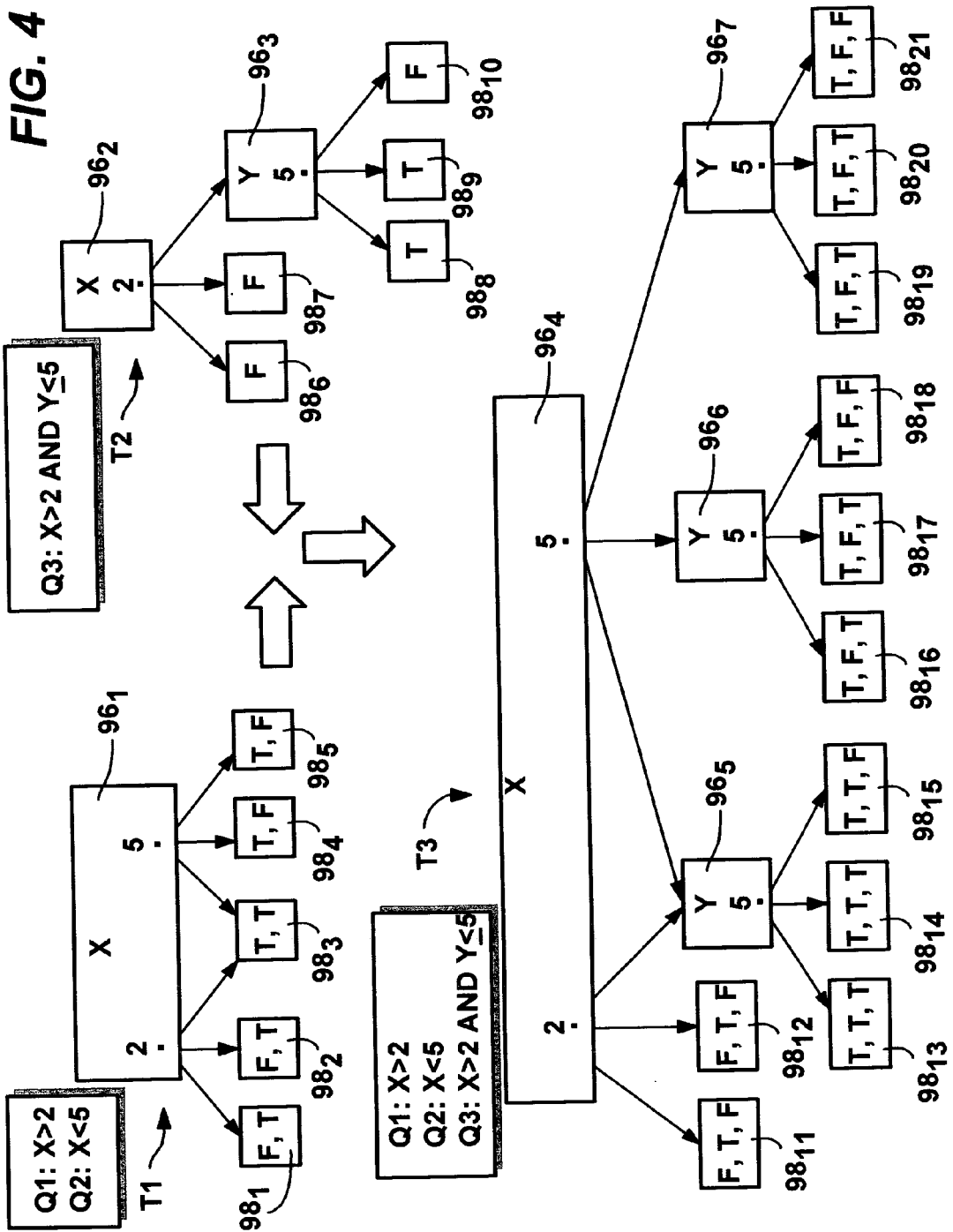
FIG. 4 is a diagram generally representing the merging of filtering trees representing multiple queries having multiple parameters without the use of an OR node into a single filtering tree.

FIG. 4 shows the merging of two filtering trees T1 and T2, into a single tree T3. As shown in FIG. 4, the tree T1 has a one decision making (non-leaf) node $96_1$ including two data points of values two (2) and five (5). The tree T1 is capable of handling the query Q1, provided by one or more subscribers requesting event notifications where some parameter X has a value greater than two, and the query Q2, provided by one or more subscribers requesting event notifications where the parameter X has a value less than five. Each data point has three branches therefrom to leaf nodes $98_1$-$98_5$, one leaf node for less than results, one for equal to results, and another for greater than results. Each leaf node specifies whether the query or queries represented by the tree T1 is satisfied. For example, each leaf node in the tree T1 has a "True" or "False" value for each query Q1 or Q2, e.g., when reached, the leaf node $98_1$ indicates that Q1 is false and Q2 is true. Alternatively, the leaf nodes may list which queries are satisfied (e.g., the "True" ones, such that the leaf node $98_1$ would only identify "Q2") or may list which subscriber should be notified. The general construction, operation and traversal of such filtering trees is also described in the aforementioned U.S. patent application Ser. Nos. 09/175,592 and 09/158,171.

To traverse such a tree T1, the actual "X" parameter value of an event is evaluated against the data points in the "X" node 961. For example, if a value of two (X=2) accompanied the event notification, the node $96_1$ would branch to the leaf node $98_2$, which indicates that query Q1 is false (since X equal to two is not greater than two) and that query Q2 is true (since X has a value less than five). As can be appreciated, the branch taken is the data point or segment (e.g., between data points) that matches the parameter's actual value.

The tree T2 shows a tree that handles a query Q3 (X>2 AND Y<=5) with two different parameters, X and Y. Note that for an X value less than or equal to two, the X node $96_2$ branches to "False" a leaf node $98_6$ or $98_7$, respectively without evaluating the Y parameter, since the X value alone makes the query Q3 false. Note that for efficiency, identical leaf nodes may be combined. If X is greater than two, however, the Y node $96_3$ is evaluated to determine whether the query Q3 is satisfied.

As also represented in FIG. 4, trees such as the tree T1 and the tree T2 may be combined, especially if they share some common event variable that makes the combination beneficial. To this end, the set of data points of common event variables in the combined node comprises the union of the data points each node of that variable, with the leaf nodes expanded to store the additional information needed for providing a result for the additional queries.

Figure 5:
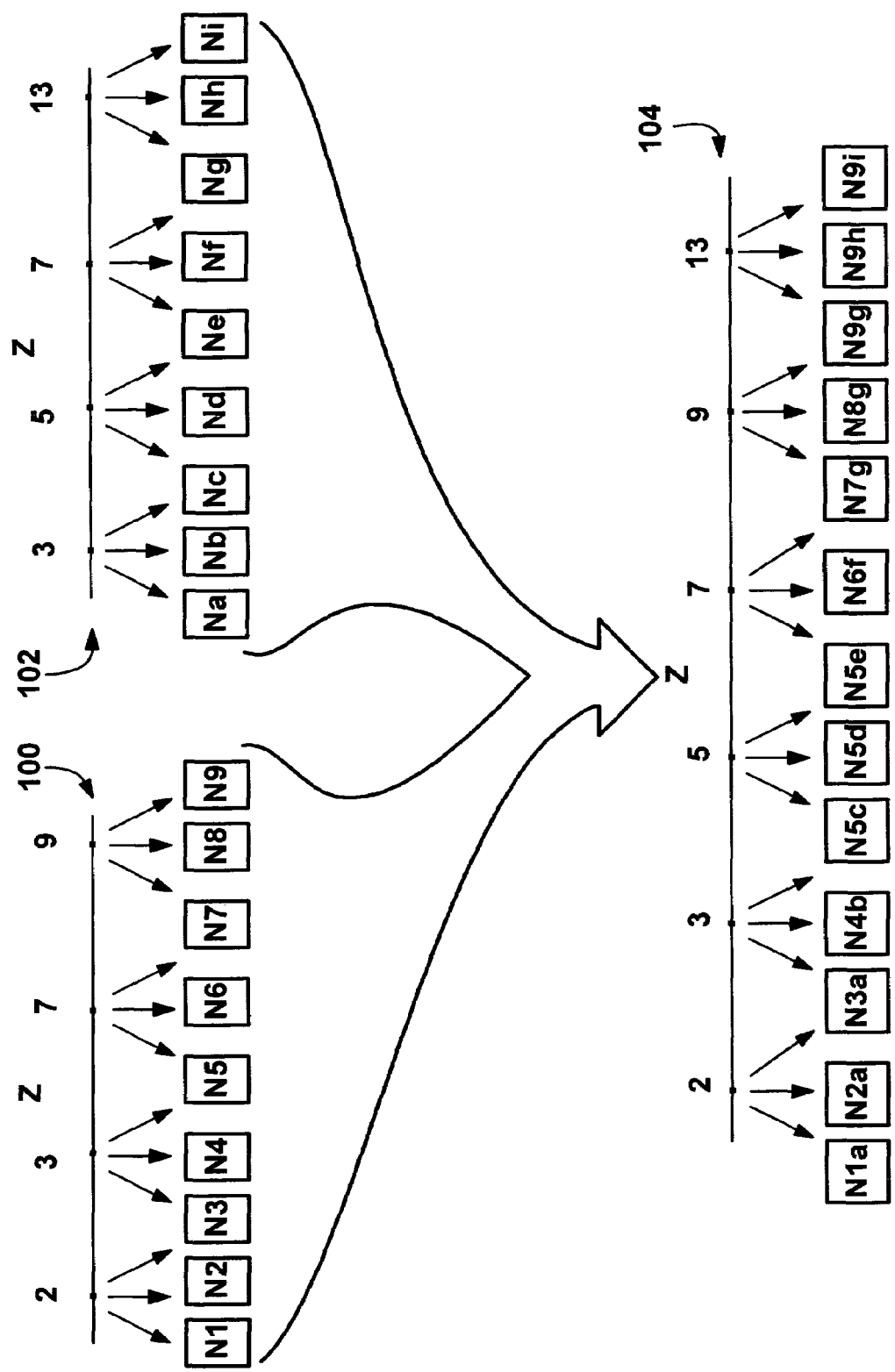
FIG. 5 is a diagram generally representing the merging of data points of two non-OR nodes representing the same event variable.

By way of example of how two nodes representing the same event variable (e.g., "Z") are merged, consider the node representations 100 and 102 shown in FIG. 5, where the node represented as 100 has data points 2, 3, 7 and 9 and the other node 102 has points 3, 5, 7, and 13. Both nodes represent the same event variable "Z." A combined "Z" node 104 is made from the union of the data points, i.e., the resulting node 104 has data points 2, 3, 5, 7, 9 and 13. Then, the combining procedure is applied to the children of the data points themselves (equal to) and the segments between the data points (the greater than, less than children). As shown in FIG. 5, wherein the child nodes (whether leaf nodes or representing a further event variable) below the node 102 are labeled N1-N9 and the child nodes below the node 104 are labeled Na—Ni, there is only one child of each node to be combined for each data point/segment. Leaf nodes are ultimately combined with other leaf nodes to provide a result that identifies how (or which of) the queries are satisfied by the merged nodes.

Thus, returning to FIG. 4, the "X" node $96_4$ has the data points two and five (i.e., the union of two, five and two), and the leaf nodes $98_{11}$-$98_{21}$ are adjusted to provide a result for queries Q1, Q2 and Q3. Note that for X values greater than two, appropriate "Y" nodes $96_5$-$96_7$ need to be evaluated to determine whether Q3 is satisfied, and thus the combined leaf nodes $98_{13}$-$98_{21}$ are placed under such Y nodes $96_5$-$96_7$. As can be readily appreciated, trees may be combined into more and more complex trees to handle more queries, more variables and/or more values of those variables.

Query Trees Including or Nodes for Event Filtering

In accordance with one aspect of the present invention, there is provided an improved filtering tree, and method and system for constructing and traversing same, in which "OR" nodes are provided. The "OR" node results in a situation wherein a single tree may need to be traversed more than once (i.e., different parts thereof), however a lesser number of nodes are needed to represent the tree. For example, even though the exemplary queries are relatively very simple in FIG. 4, it is apparent that the "Y" parameter evaluation requires that separate "Y" nodes $96_5$-$96_7$ (that essentially perform the same comparison but have slightly different children) be provided in the tree. A more complex tree can grow substantially larger than that shown in FIG. 4, whereby the benefit of a single traversal is outweighed by the size of the tree.

Figure 6:
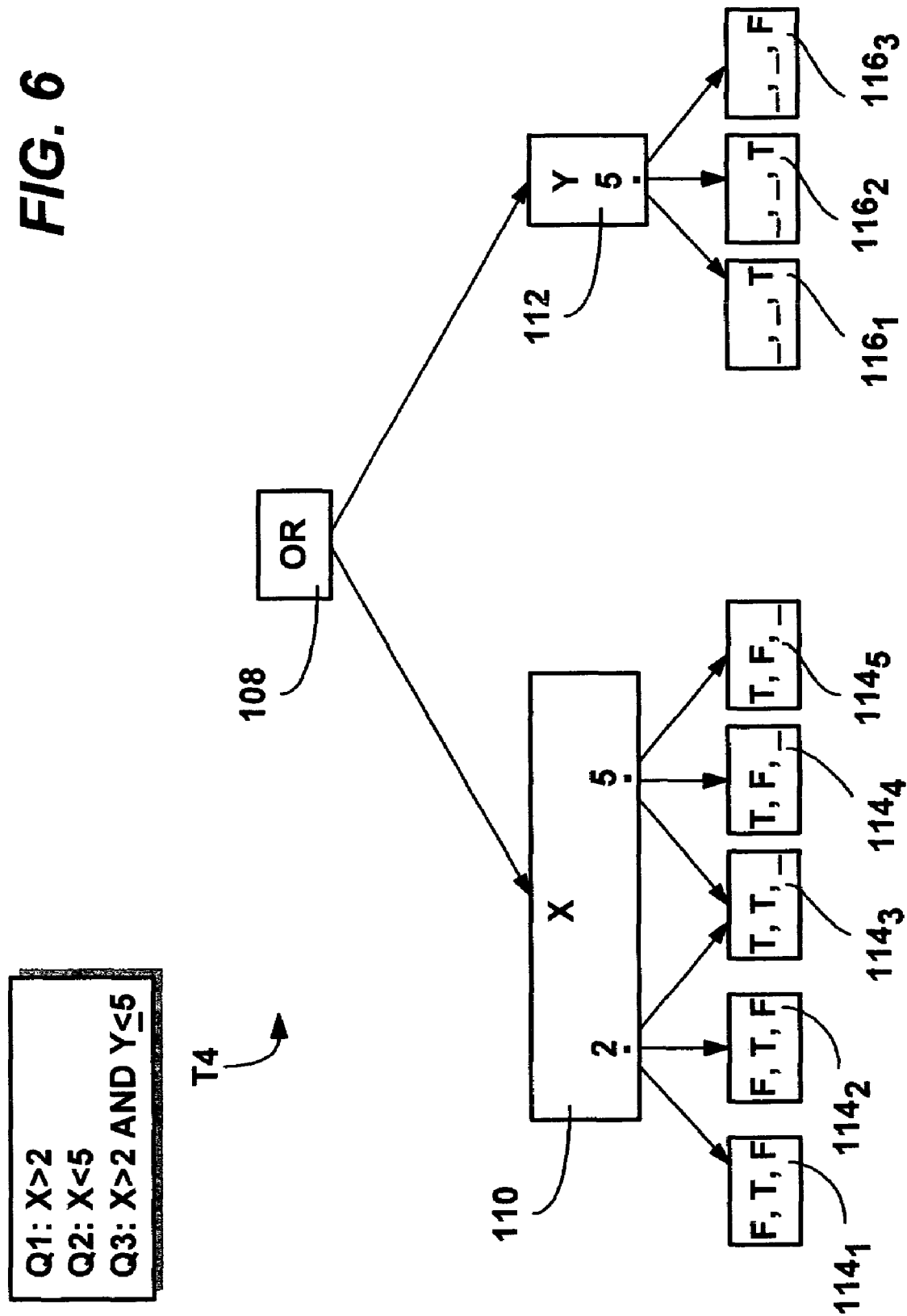
FIG. 6 is a diagram generally representing the merging of filtering trees representing multiple queries having multiple parameters into a single filtering tree using an OR node in accordance with an aspect of the present invention.

As represented in FIG. 6, an improved (in terms of reduced size) tree T4 is provided, and includes an "OR" node 108. The OR node 108 provides a mechanism via which a tree can filter events to determine which queries are satisfied by the event, with but with fewer nodes than trees consisting of only non-OR nodes. Indeed, the tree T4 provides the same results as the tree T3, but with fewer nodes.

To traverse the tree T4, the leftmost branch of the OR node 108 is taken first (for purposes of convenience, as any order is feasible). This branch reaches the "X" node 110 with data points two and five (the only other branch is to the "Y" node 112, although more than two branches are possible). Depending on the actual value of the X parameter, the node 110 will branch to one of the leaf nodes $114_1$-$114_5$. It is possible that the X value alone will satisfy all of the queries Q1, Q2 and Q3, in which event no other branches (e.g., the right branch) of the OR node need be taken. This is indicated in FIG. 6 by the nodes $114_1$-$114_2$, wherein the results of all three queries are known via the X value alone.

However, not all of the results may be obtainable via the left branch, and for some events, the next branch (to the right) of the OR node need be taken. This is indicated in FIG. 6 by the nodes $114_3$-$114_5$, wherein the results of all three queries are not known by the X value alone, but depend on another branch, as shown in FIG. 6 by the underscore character (_) representing the missing information. When a leaf node is encountered that indicates the next branch needs to be taken, the known results are recorded, if any, and the process returns to the OR node to take the next branch. In the present example, this is the right branch to the "Y" node 112, which may provide the missing information. Note that in this example, the leaf nodes $116_1$-$116_3$ of the "Y" node 112 include the missing information that is needed to determine whether the query Q3 is satisfied, and the information regarding Q1 and Q2 is already known from traversing the leftmost branch. However, in other situations, a tree may have more than two branches under an OR node, and the needed information may need to be determined by traversing further branches. In such an event, the traversal process will continue to move to the next branch right, until the information is obtained.

Note that as shown in FIG. 6, a series of True/False values are used to represent, in order, whether the queries are satisfied by a given event. When all possible queries of an OR tree have a true or false answer therefor, no further branches need be taken. However, if instead the leaf nodes list only the satisfied (true) queries, (or subscribers to notify), then each branch may need to be taken to accumulate a complete set of satisfied queries. The traversal process will thus end when no more branches need to be traversed.

Figure 7:
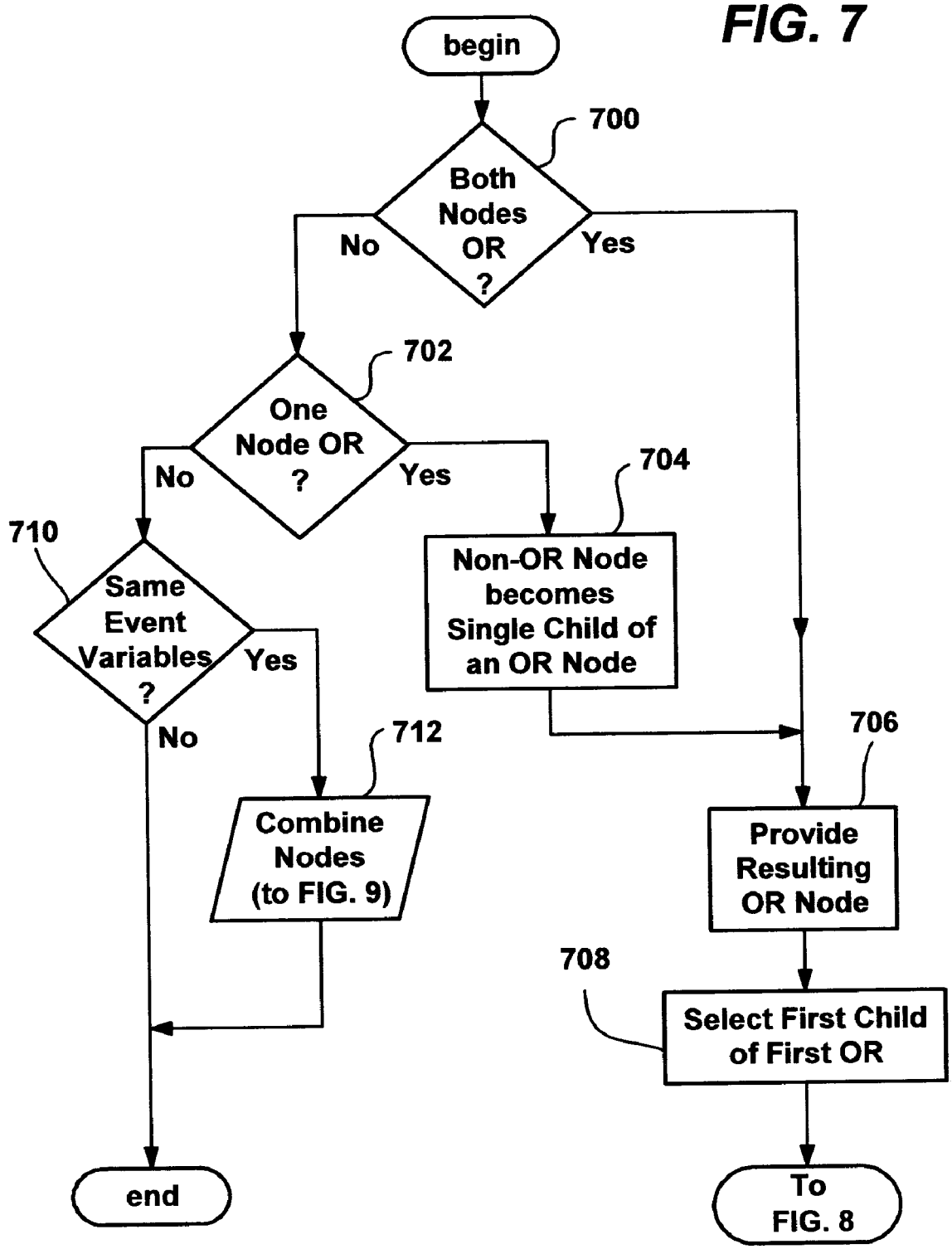
FIGS. 7 and 8 comprise a flow diagram generally representing logical steps when merging two trees in accordance with an aspect of the present invention.
Figure 8:
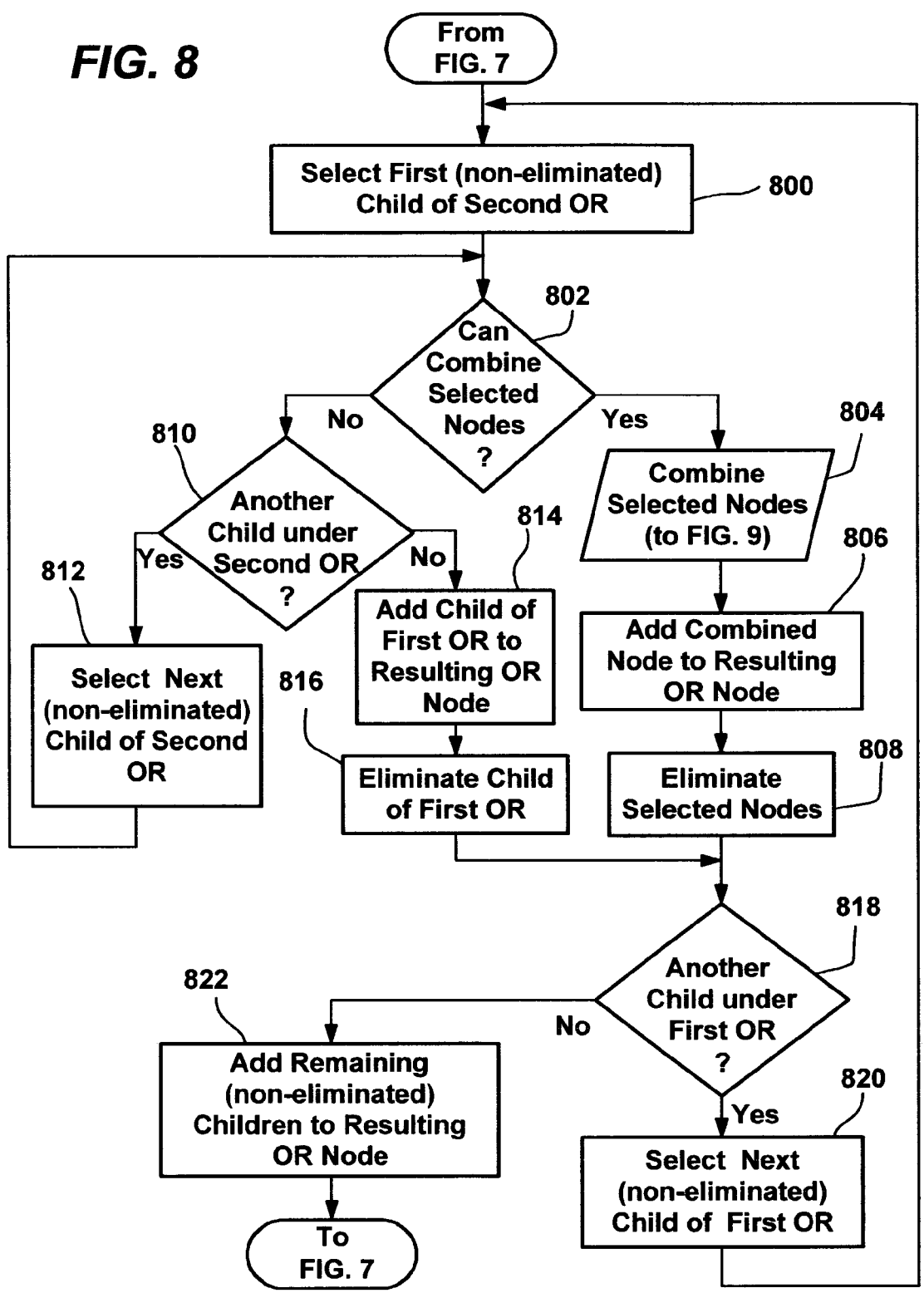
Figure 9:
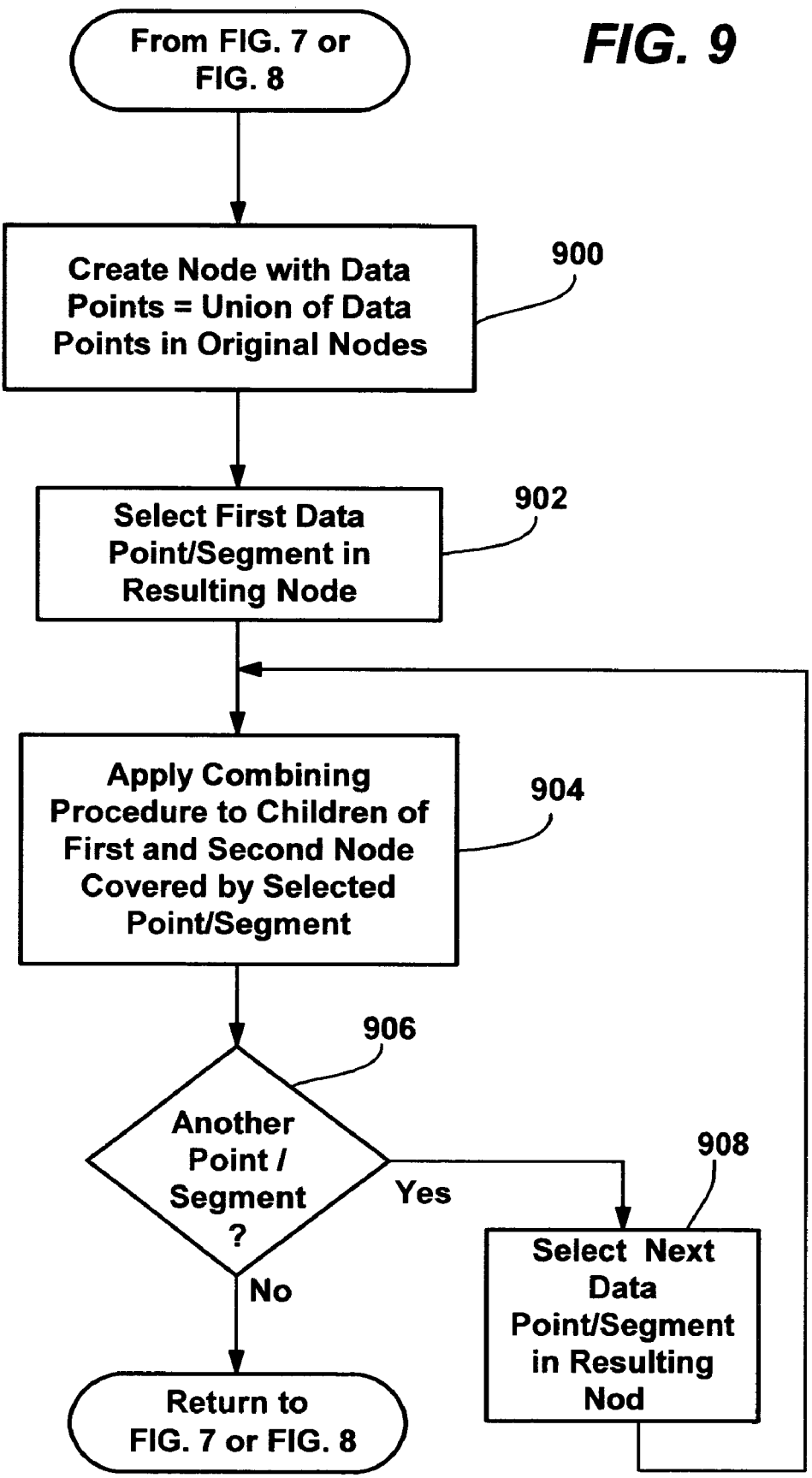
FIG. 9 is a flow diagram generally representing the merging of non-OR nodes.

FIGS. 7-9 generally describe how a tree with OR nodes is constructed, along with some general rules provided herein. When combining two evaluation trees to produce a single evaluation tree, the combination procedure proceeds recursively, that is, the root node of the first tree is combined with the root node of the second tree, and the process continues on to the children as directed. Also, an OR node cannot be a child of another OR node, as will become apparent below. Note that the combining procedure for two nodes (described above with respect to FIG. 5 and below with respect to FIG. 9) may result in one of two outcomes, namely creation of a new, combined node, or a failure to combine, in which event an OR node is created with the two nodes as children.

Figure 10:
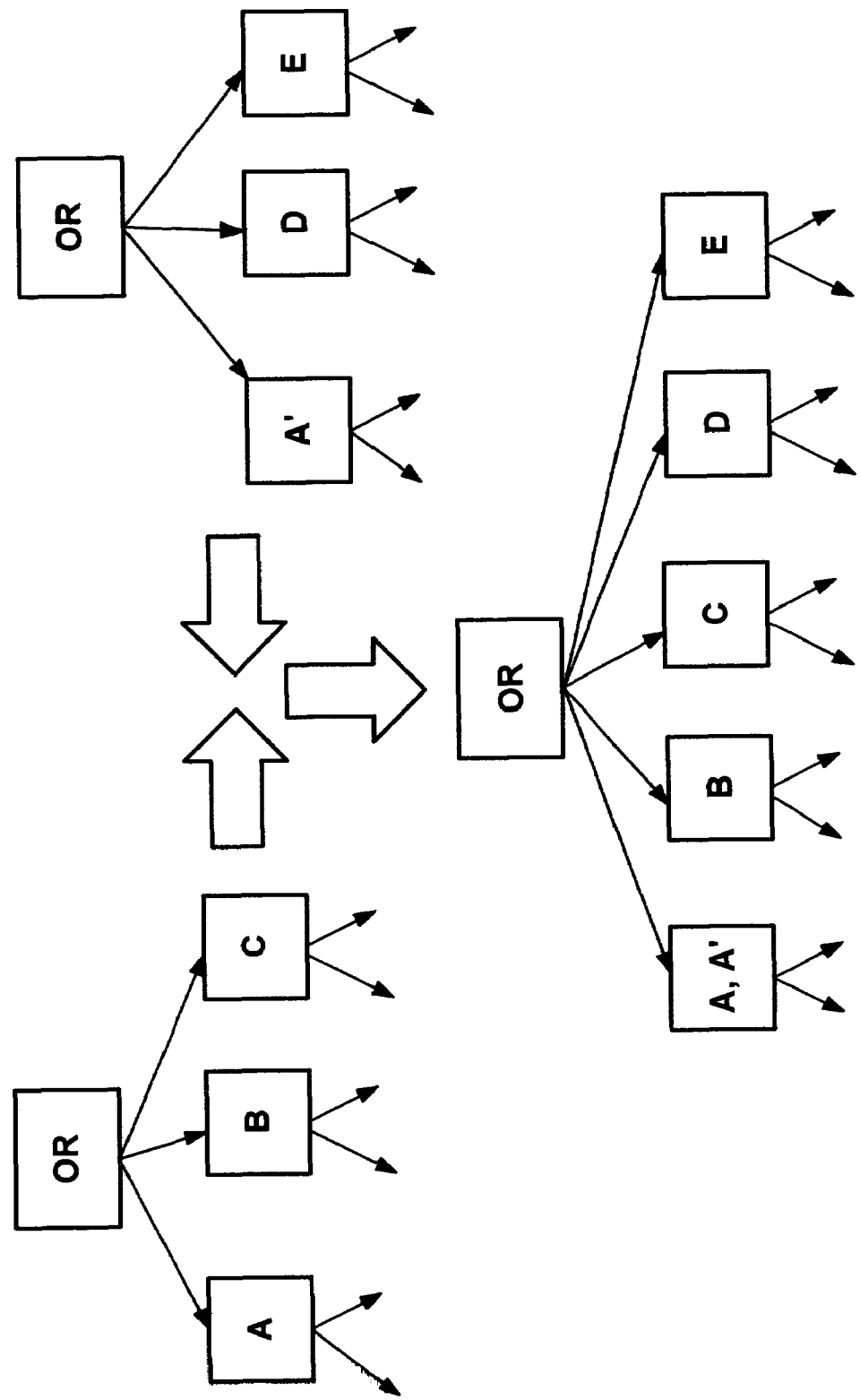
FIGS. 10 and 11 are diagrams generally representing the merging of various types of trees.

Beginning at step 700 of FIG. 7, when combining nodes, a test is performed to determine if both nodes are OR nodes. If not, the process branches to step 702, as described below. If both nodes are OR nodes, the combining procedure succeeds and returns an OR node, as shown in step 706, and a first child or the first (OR) node is selected at step 708. FIG. 10 shows two OR nodes, one with child nodes A, B and C thereunder, and the other with trees of nodes A', D and E thereunder, where the common letters in "A" and "A'" represent event variables that may be combined as described above. Thus, step 708 would select the "A" node.

As represented in steps 800-818 of FIG. 8, for every child of the first node, the procedure tests it against every child of the second node to see if the combining procedure for the two children would succeed. This is shown beginning at step 800, wherein the first (non-eliminated) child of the second node, i.e., the A' node, is selected. If the nodes can be combined as shown via step 802, the node is combined (step 804 and FIG. 9), and the resulting combined node is added to the resulting OR node (that was provided at step 706) at step 806. Via step 808, both children are then eliminated from the further consideration.

If more children are under the first OR node, e.g., the "B" node, (step 818), then the next node of the first node is selected at step 820 and tested against the first non-eliminated child under the second OR node, e.g., the "D" node. If the nodes cannot be combined, step 802 branches to step 810 to select another node e.g., the "E" node at step 812. The process repeats until no nodes remain under the second for possible combination thereof, as determined via step 810. If the selected child of the first OR node cannot be combined with a child of the second OR node, the selected child of the first OR node is added to the resulting OR node at step 814, and this child is eliminated from further consideration (step 816). Steps 818 and 820 handle the selection of all non-eliminated children under the first node, such that the "C" node in the example of FIG. 10 is selected, after which the combining process returns to step 800 to test the "C" node for possible combination with non-eliminated children of the second OR node. When each node has been tested against each other node, step 822 is executed to add any remaining non-eliminated nodes as children to the resulting OR node.

FIG. 9 summarizes how non-OR nodes are combined, (as also described above with respect to FIG. 5). First, at step 900, a node is created with the union of the data points of the two original nodes. Then, via steps 902-908, for every point/segment in the resulting node, the combining procedure is recursively applied to the children of the first and second node that were responsible for the area covered by the selected segment/point. As described above, there is only one such child in the first node and one such child in the second node. The process is recursively applied to nodes at each level of the tree, i.e., child nodes below a merged node are merged into a child merged node, any children thereof are similarly merged when possible, and so forth.

Figure 11:
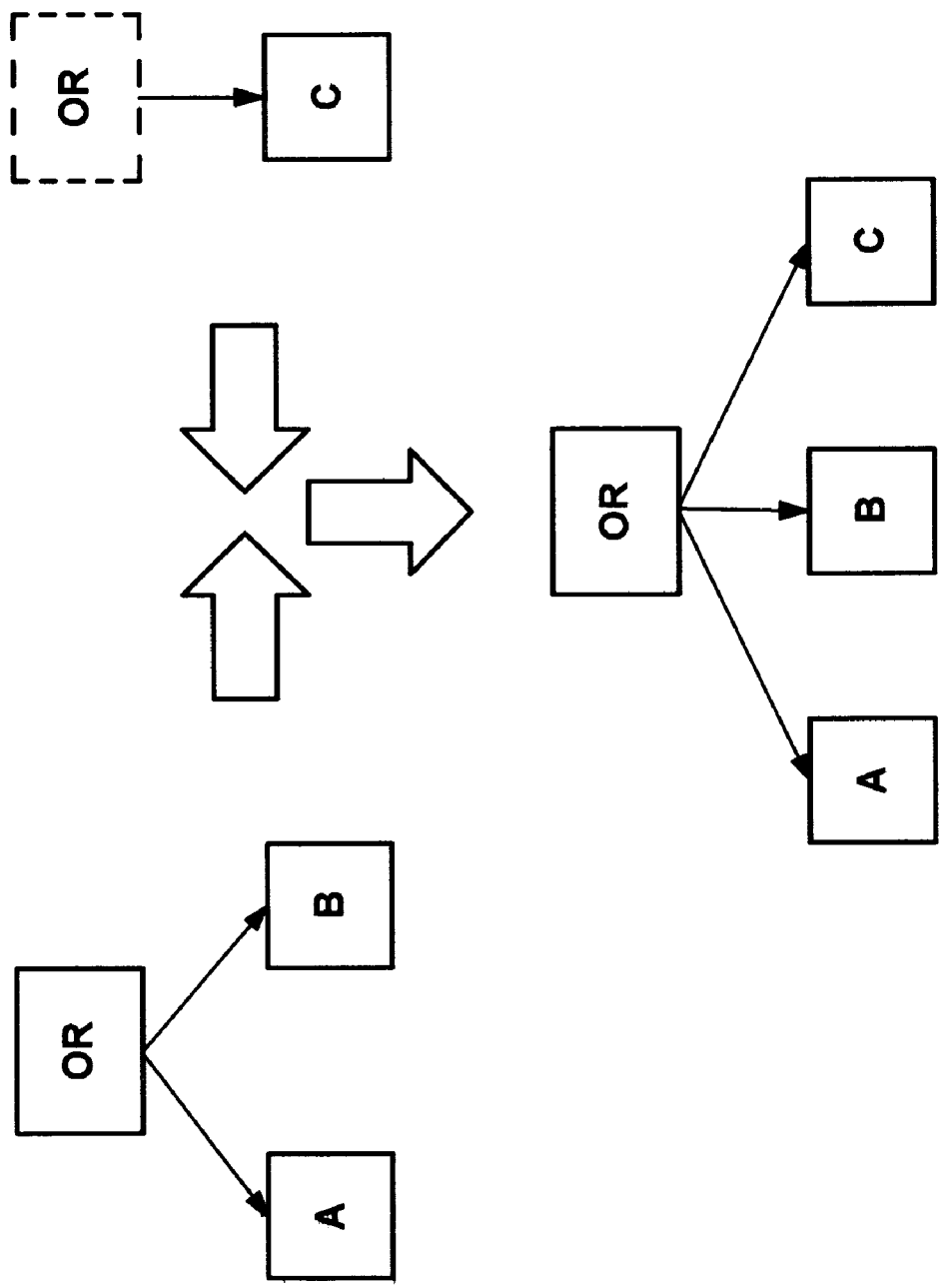

Returning to step 700 of FIG. 7, if both nodes to be combined are not OR nodes, e.g., as shown in FIG. 10, then step 702 represents the determination as to whether one of the nodes is an OR node. If so, the non-OR node essentially is treated as a single-child of OR node, as generally shown in FIG. 11, wherein the dashed box indicates such a "virtual" OR node. Then, the combining procedure for two OR nodes is applied, as described above with reference to steps 706-818.

If neither of the nodes to possibly combine are OR nodes, then step 710 tests whether the two nodes represent the same event variables. If not, there is nothing to be gained by combining them and the procedure fails for these nodes. Otherwise the process branches to step 712 (to FIG. 9) to combine these nodes as described above. In this manner, a OR node tree is constructed with combined nodes thereunder as appropriate, providing a reduced number of nodes.

Lastly, one extension to the above-described procedure compares the space savings obtained via the OR node tree with the size of the original, non-OR trees. This is accomplished by comparing the total number of nodes in the combined tree to the total number of nodes in the original trees. If the first number of nodes (in the combined tree) exceeds a certain percentage of the second number, and the first number of nodes is sufficiently large, the operation fails and the combined tree is discarded. For example, one system uses one-hundred and fifty percent (150%) and ten (10) nodes as the thresholds for evaluation.

As can be seen from the foregoing detailed description, there is provided a method and system for combining trees using OR nodes, and traversing those trees for event filtering. The system and method are efficient, flexible and provide numerous benefits including space savings in event and other types of filtering.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having an event management system for detecting events as they occur and selectively reporting them to one or more subscriber applications, a method of combining first and second filtering trees usable for determining which detected events should be reported to the one or more subscriber events by merging the first and second filtering trees to create an output filter tree used to selectively report events, the method comprising:

accessing first and second filtering trees used to determine whether an event detected by a computing system should be reported to one or more subscriber applications;

determining that a first node at a topmost level of the first filtering tree is an OR node;

determining that a second node at a topmost level of the second filtering tree is also an OR node;

in response to determining that an OR node is at the topmost level of each of the first and second filtering trees, creating a single output filtering tree and storing it on computer readable storage media, the single output filtering tree providing a resulting OR node at a topmost level of the output filtering tree; and adding each child node of the first tree and each child of the second tree into the single output filtering tree as child nodes, and such that the single output filtering tree when traversed with actual event data, is configured to identify when an event corresponding to the actual event data is to be reported to the one or more subscriber applications, and wherein adding each child of the first tree and each child of the second tree comprises:

merging each child node of the first tree with a child node of the second tree into a merged node when such nodes can be successfully combined, and adding to the single output filtering tree each merged node as a child node of the resulting OR node;

adding to the single output filtering tree each child node of the first tree and each child node of the second tree that cannot be successfully combined as a child node of the resulting OR node; and after any child node of the first tree and the second filtering tree have been added to the output filtering tree in a merged node or as a child node of the resulting OR node, eliminating each child from further consideration for merging.

2. The method of claim 1 further comprising, merging child nodes beneath a merged node into a merged child node when child nodes can be successfully combined.

3. The method of claim 1 wherein merging each child node that can be successfully combined includes performing a union of a set of data points of each node.

4. The method of claim 1 wherein the topmost nodes of the first and second filtering trees do not represent the same event variable, and further comprising, providing an OR node in the output filtering tree, and adding the first and second trees to the OR node as children thereof.

5. The method of claim 1 wherein the topmost nodes of the first and second filtering trees represent the same event variable, and further comprising, merging the topmost nodes into a merged node.

6. The method of claim 5 wherein merging the topmost nodes includes performing a union of a set of data points of each node.

7. The method of claim 5 further comprising merging child nodes at each level of children below the merged node into a merged child node when such child nodes can be merged.

8. The method of claim 1 further comprising, traversing the resultant filtering tree with actual event data.

9. A computer readable storage media having encoded thereon computer executable instructions that when executed by a processor, cause the processor to execute a method as recited in claim 1.

* * * * *